3,320,995
HANDLE ASSEMBLIES FOR HANDBAGS OR THE LIKE AND METHOD FOR MAKING THE SAME
Daniel I. Reiter, 11 E. 31st St., New York, N.Y. 10016
Filed Jan. 5, 1965, Ser. No. 423,505
8 Claims. (Cl. 150—33)

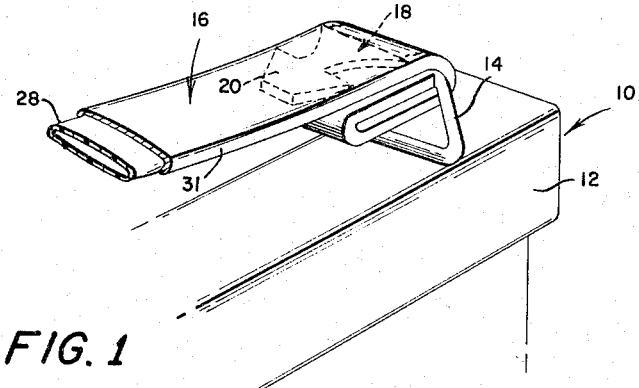
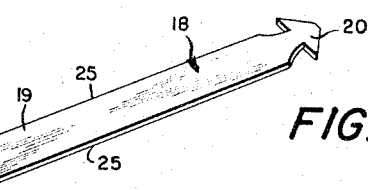
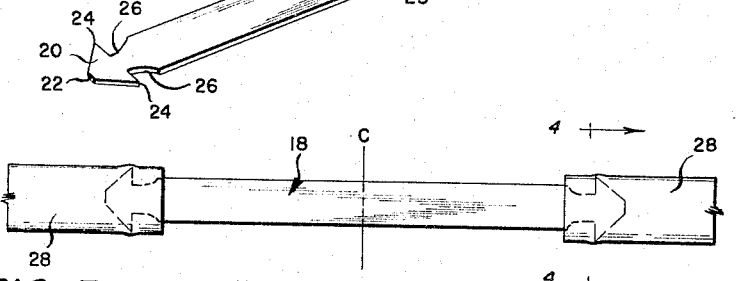
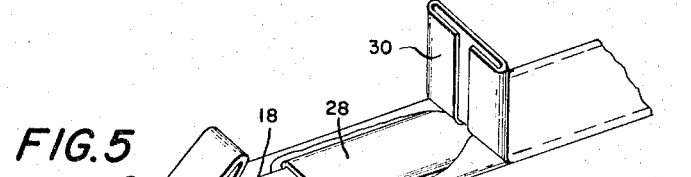
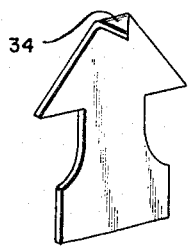
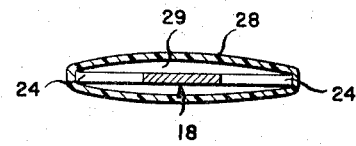
INVENTOR
DANIEL I. REITER
BY Shapiro and Shapiro
ATTORNEYS United States Patent Office 3,320,995
Patented May 23, 1967

This invention relates to handle assemblies for handbags or the like and more particularly to methods of making such assemblies in continuous lengths having multiple handles connected seriatum.

Patent No. 3,095,641 issued July 2, 1963, to R. Siegel discloses a method for making handbag handles which comprises attaching a bendable reinforcing member between each of a plurality of longitudinally spaced insert members to make a continuous strip, encasing the continuous strip in a continuous outer cover, and cutting the strip in approximately the center of each of the reinforcing members to form handles with covered reinforcing sections at each end. The so-called reinforcing members are elongated metal strips provided with transverse gripping terminals at each end which are bent about the corresponding ends of tubular insert members so as to clamp the material of the insert members, which may be rubber or plastic. In order to provide a firm grip upon the ends of the insert members the clamping must be tight enough to deform the insert members substantially from their normal tubular shape, and it is difficult to provide an ultimate handle with the desired smooth exterior appearance. Not only are the insert members deformed, but the gripping terminals wrapped about the ends of the insert members present bumps which are difficult to hide. In addition, the manufacturing operation of wrapping the gripping members about the ends of the reinforcing members is unduly complicated, increasing the cost of the finished product.

It is accordingly an object of the present invention to provide improved handle assemblies for handbags or the like.

Another object of the invention is to provide improved components for such handle assemblies.

Still another object of the invention is to provide an improved method for making a handle for a handbag or the like.

A more specific object of the invention is to provide an improved method of making handles seriatum in continuous lengths.

Briefly stated, the present invention utilizes attachment devices which initially are paired in the form of an integral elongated metal strip member provided with an arrow head at each end. These strip members are assembled seriatum with intervening tubular handle fillers by inserting the arrow heads in the corresponding ends of successive fillers, so that the fillers and attachment device pairs form a continuous strip having alternating fillers and attachment device pairs. This strip may then be covered by a suitable material to provide continuous handle stock. To make an individual handle for attachment to a handbag it is merely necessary to dissect the attachment device strip members at the opposite ends of a filler. The attachment devices at the respective ends of the filler may then be bent so as to embrace a ring which is secured to the corresponding end of a handbag frame.

The foregoing and other objects, advantages, and features of the invention, and the manner in which the same are accomplished will become more readily apparent upon consideration of the following detailed description of the invention taken in conjunction with the accompanying drawing, wherein:

FIGURE 1 is a fragmentary perspective view illustrating the manner in which one form of handle made in accordance with the invention may be secured to a handbag frame;

FIGURE 2 is a perspective view of an attachment device strip;

FIGURE 3 is a contracted plan view illustrating the manner in which the attachment device strips are assembled with intervening fillers;

FIGURE 4 is a transverse sectional view taken along line 4—4 of FIGURE 3;

FIGURE 5 is a fragmentary perspective view illustrating a typical handle (slightly different from the handle of FIGURE 1) partially broken away to show the covering and manner in which the attachment device at one end may be assembled with a ring; and FIGURE 6 is a fragmentary perspective view of a modified form of attachment device.

Referring to the drawing, FIGURE 1 illustrates a portion of a handbag 10 having a frame 12 provided with a metal ring 14 at each end thereof (only one being shown) to which the corresponding end of a handle 16 is attached as will be described more fully hereinafter. The complete handle may be generally crescent shape.

FIGURE 2 illustrates an attachment device strip member utilized in the making of the handle. The strip member 18 has a major portion 19 of elongated, flat, generally rectangular configuration and is provided with an arrow head 20 at each end directed away from the major portion 19. Each arrow head may have a blunted tip 22 and relatively sharp trailing vertices 24 which project laterally slightly beyond the side edges 25 of the major portion 19. The lateral edge portions of the strip member adjacent to the arrow heads may be undercut as shown at 26 at each side thereof to provide strip portions of reduced width. Typically the strip member is about 4½ inches long and about 5/16 of an inch wide along the major portion 19 of its length. The width across the trailing vertices of the arrow head may be about 13/32 of an inch and the width of the undercut portions 26 just behind the arrow heads about 5/32 of an inch. The thickness may be slightly less than 1/32 of an inch.

As shown in FIGURE 3, the ends of the strip member are inserted in the corresponding ends of tubular handle fillers 28, the length of which is determined by the length of the ultimate handle. The fillers may be formed of suitable plastic or rubber material and may have generally oval cross section, although the underside may be somewhat flatter than the upper. The width of the passage 29 through the fillers may be approximately the same as the width of the major portion 19 of the attachment device strip members and is somewhat less than the width across the vertices 24 of the strip members. Thus, when an arrow head is inserted into the end of a filler passage, the flexible filler material is deformed slightly, but minimally. Preferably the deformation is just sufficient to ensure firm gripping of the arrow head vertices 24. Because of the configuration of the arrow head and the protrusion of the filler material into the undercut portions 26, the strip cannot be easily withdrawn from the filler once assembled therewith. The total insertion of the strip members may be about 7/16 of an inch.

As is apparent from FIGURE 3, by inserting the ends of a strip member 18 into correspoding ends of adjacent fillers 28 and by inserting other strip members into the remaining ends of those fillers, and so on with additional fillers and strip members, a continuous indeterminate length of handle stock may be formed in an exceptionally simple and economical manner. The assembled fillers and attachment device strip members may be covered, as illustrated in FIGURE 5 for example, by enveloping the assembly in a suitable covering material 30, such as leather or plastic sheet. In the form shown in FIGURE 5 upper and lower lengths of such material with turned-in edge portions are aligned and stitched along the edges to provide the complete covered handle assembly. Other forms of coverings, such as continuous tubes (shown at 31 in FIGURE 1) or single-seam wrappings may also be used.

To provide a handle for assembly with a handbag frame it is simply necessary to sever a handle unit from the continuous strip. Thus, as indicated in FIGURE 3, the attachment strip members 18 (and the covering) may be cut transversely in half at the opposite ends of a selected filler 28, as indicated at line C, to form an individual handle. To complete the handle installation it is only necessary to bend the attachment device at each end of the filler so as to embrace a ring. FIGURE 5 illustrates the use of a C-ring 32 with the attachment device bent double over the ring bight. The ends of the C-ring may then be inserted into the corresponding ends of a small tube secured to the handbag frame, as is well known. In FIGURE 1 a different embodiment is shown, wherein a closed ring 14 is already fixed to the handbag frame 12, as is well known, and the attachment device is bent around one side of the ring. The handle 16 is shown broken away to expose the filler 28 and covering 31 which extend to the other end of the frame, where the corresponding end of the handle is attached to another ring 14 on the frame in the foregoing manner.

FIGURE 6 illustrates a modification of the attachment device. In accordance with this form of the invention the tip 34 of each arrow head is pointed and is bent at a right angle to the plane of the remainder of the strip member, so that when the arrow head is introduced into the passage of a filler the tip 34 will bite into the passage wall in a plane orthogonal to the plane in which the trailing vertices 24 bite into the passage wall. As set forth in the applicant's Patent #2,978,776, this provides additional resistance to withdrawal of the arrow head from the passage.

By virtue of the invention it is possible to provide handbag handles much more economically than has been possible heretofore and yet to provide handles which present a pleasing appearance. It should be especially noted that the use of attachment strip members with an arrow head at each end permits the successive strip members and fillers to be assembled seriatum along a single line of movement. Since the covering material can be applied along the same line of movement, the invention is especially adapted to mass production through the use of simple machinery in which the parts are fed continuously in substantially the same direction.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. An attachment member for a handle, comprising an elongated, flat strip of stiff, bendable material, said strip having an elongated, generally rectangular major portion of predetermined width with an arrow head at each end thereof directed away from that end, each arrow head having a pair of trailing vertices laterally projecting slightly beyond the adjacent lateral edges of said major portion, said strip having an undercut lateral edge portion between each of said vertices and the corresponding lateral edge of said major portion, whereby when the ends of said strip are inserted into corresponding flexible tubular members having a passage substantially the same width as said major portion, the vertices bite into the wall of the passage and the material of the wall may protrude into the undercut portions in order to fix the attachment member to said tubular members.

2. A multiple handle assembly comprising a series of spaced, flexible, tubular handle members with intervening attachment device strip members, each tubular member having an axial passage of predetermined width, each attachment member comprising an elongated, flat strip of stiff, bendable material, said strip having an elongated, generally rectangular major portion of predetermined width with an arrow head at each end thereof directed away from that end, each arrow head having a pair of trailing vertices laterally projecting slightly beyond the adjacent lateral edges of said major portion, said strip having an undercut lateral edge portion between each of said vertices and the corresponding lateral edge of said major portion, the width of said major portion being substantially the same as said width of said passage, the arrow heads of each attachment member extending a short distance into corresponding passage ends of the adjacent tubular handle members with the vertices biting into the walls of the passages so that the material of the passage walls may protrude into the undercut portions.

3. A method of making handles which comprises providing tubular handle members each having an axial passage, providing attachment device strip members each having laterally projecting points at its opposite ends, inserting seriatum the ends of said attachment device strip members into corresponding passage ends of said tubular members so that the points bite into the passage walls to join said tubular members and said strip members and to form a continuous length with alternating tubular members and strip members, and dissecting said strip members to provide a plurality of separate tubular members with an attachment device at each end thereof.

4. The attachment member of claim 1, the tip of each arrow head being pointed and being bent orthogonally to the remainder of the arrow head in order to engage the passage wall orthogonally to the trailing vertices.

5. The assembly of claim 2, said arrow heads having pointed tips bent orthogonally to the remainder of the arrow heads to engage the associated passage walls orthogonally to the trailing vertices.

6. The assembly of claim 2, said tubular members and said strip members being enclosed by a continuous covering.

7. The method of claim 3, further comprising bending said attachment devices so as to embrace corresponding rings for attaching said handles.

8. The method of claim 3, said continuous length being covered prior to the dissection of said strip members and the covering being cut as said strip members are dissected.

References Cited by the Examiner

UNITED STATES PATENTS 2,978,776  4/1961  Reiter _____ 150—33 X
3,095,641  7/1963  Seigel _____ 190—57 X FRANKLIN T. GARRETT, *Primary Examiner.*